United States Patent
de Mier

(10) Patent No.: US 7,590,121 B2
(45) Date of Patent: Sep. 15, 2009

(54) TRANSMITTER, RECEIVER, COMBINED TRANSCEIVER, AND RADIO LINK FOR COMMUNICATING A DATA STREAM OF DATA PACKETS, METHOD FOR RECEIVING A DATA STREAM OF DATA PACKETS, METHOD FOR OPERATING A RADIO LINK, AND BICYCLE AND FITNESS COMPUTERS UTILIZING THE TRANSMITTER AND RECEIVER

(75) Inventor: Eduardo de Mier, Parsdorf (DE)

(73) Assignee: BM Wireless Ltd. & Co. KG, Nandlstadt (DE)

( * ) Notice: Subject to any disclaimer, the term of this patent is extended or adjusted under 35 U.S.C. 154(b) by 926 days.

(21) Appl. No.: 10/166,477

(22) Filed: Jun. 10, 2002

(65) Prior Publication Data

US 2002/0196748 A1 Dec. 26, 2002

Related U.S. Application Data

(63) Continuation of application No. PCT/DE00/04411, filed on Dec. 11, 2000.

(30) Foreign Application Priority Data

Dec. 9, 1999 (DE) .................................. 199 59 545

(51) Int. Cl.
*H04L 12/28* (2006.01)
*H04L 12/56* (2006.01)
*H04J 3/24* (2006.01)

(52) U.S. Cl. ................... 370/394; 370/392; 370/475
(58) Field of Classification Search ................. 370/311, 370/392, 394, 474, 475
See application file for complete search history.

(56) References Cited

U.S. PATENT DOCUMENTS 5,453,987 A 9/1995 Tran
5,610,595 A * 3/1997 Garrabrant et al. ..... 340/825.52
5,663,716 A 9/1997 Miwa et al.

(Continued)

FOREIGN PATENT DOCUMENTS

CN 1141711 1/1997

(Continued)

OTHER PUBLICATIONS

Blackmore, P. et al.: "Coding Techniques to Improve the Reliability of EMCON Transmissions", IEEE, Oct. 22, 1996, pp. 447-452.

*Primary Examiner*—Chi H Pham
*Assistant Examiner*—Warner Wong
(74) *Attorney, Agent, or Firm*—Scott T. Weingaertner; Eric L. Sophir; King & Spalding LLP

(57) ABSTRACT

A radio link with transmitters and a receiver transmits data packets of a data stream at a regular time interval. To receive the data packets, the data stream is sampled for the presence of data packets in a locked mode. In addition, times for an expected reception of one data packet each are predetermined. In a transmission mode, one data packet each is sampled at regular time intervals, it being determined from a comparison of a test coding with the content of the data packet whether an error-free data packet is present.

41 Claims, 7 Drawing Sheets

U.S. PATENT DOCUMENTS

| | | | |
|---|---|---|---|
| 5,781,593 A * | 7/1998 | Petch et al. | 375/354 |
| 5,835,850 A | 11/1998 | Kumar | |
| 5,913,827 A * | 6/1999 | Gorman | 600/509 |
| 6,408,003 B1 * | 6/2002 | Rezaiifar et al. | 370/394 |
| 6,445,717 B1 * | 9/2002 | Gibson et al. | 370/473 |
| 6,580,713 B1 * | 6/2003 | Abe | 370/394 |
| 6,621,826 B1 * | 9/2003 | Taketsugu | 370/437 |
| 6,717,915 B1 * | 4/2004 | Liao et al. | 370/252 |
| 6,731,602 B1 * | 5/2004 | Watanabe et al. | 370/231 |
| 6,967,943 B1 * | 11/2005 | Hamalainen et al. | 370/347 |

FOREIGN PATENT DOCUMENTS

| | | |
|---|---|---|
| CN | 1176539 | 3/1998 |
| DE | 40 34 005 A1 | 6/1991 |
| DE | 42 29 073 A1 | 3/1994 |
| DE | 196 00 922 A1 | 7/1997 |
| EP | 0 698 974 A1 | 2/1996 |
| EP | 0 962 904 A2 | 12/1999 |
| WO | WO 95/23489 | 8/1995 |
| WO | WO 97/25699 | 7/1997 |

* cited by examiner

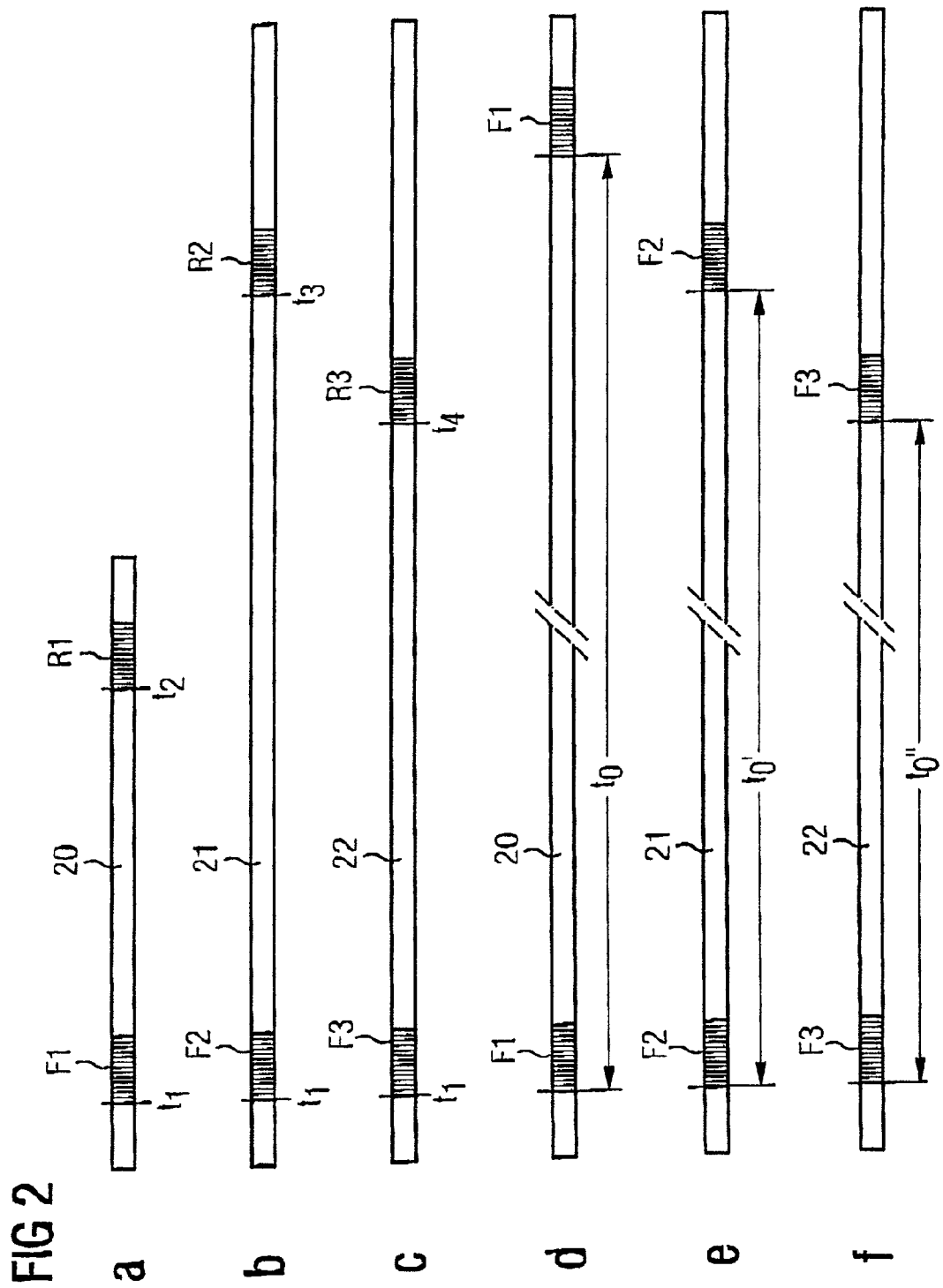

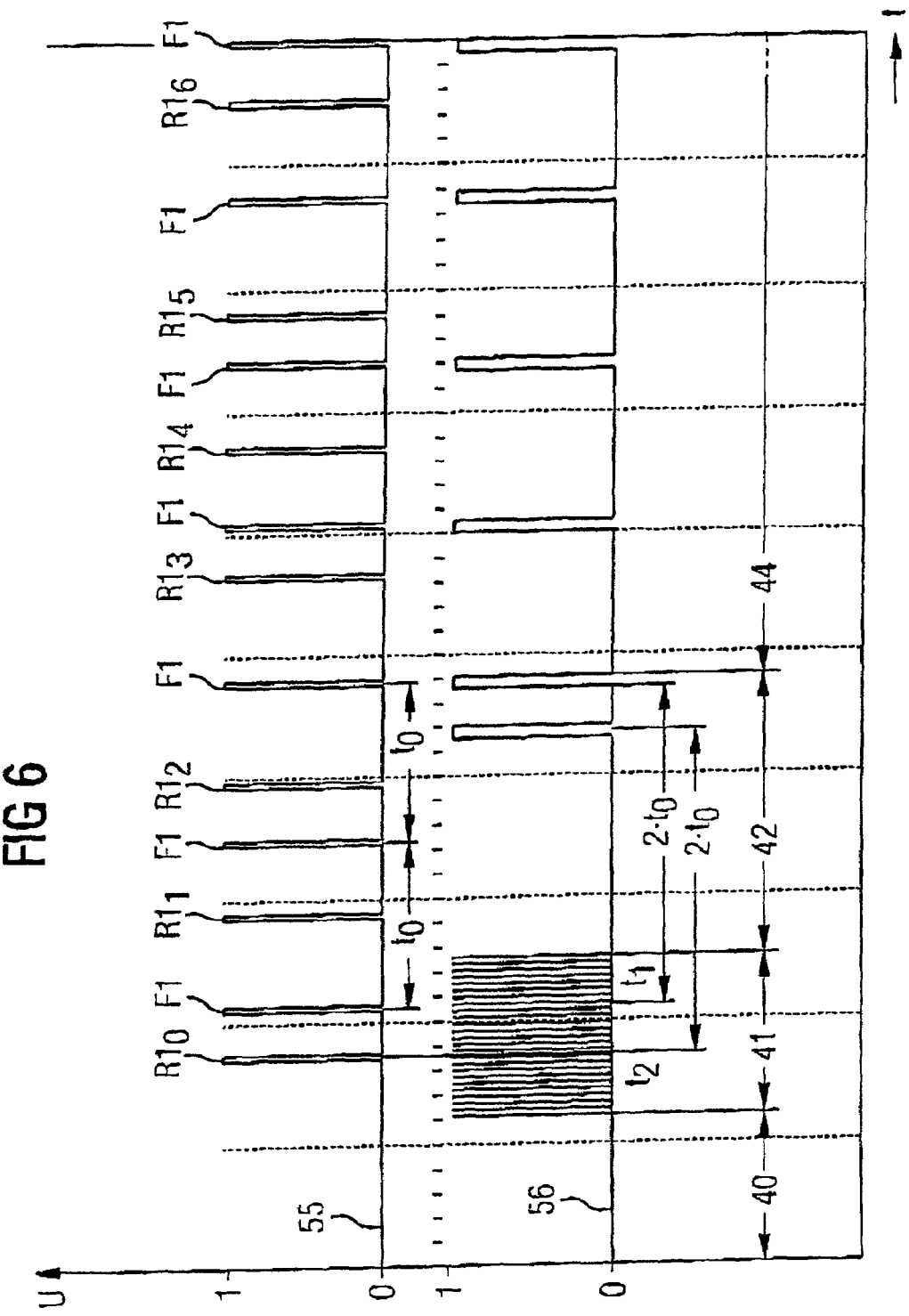

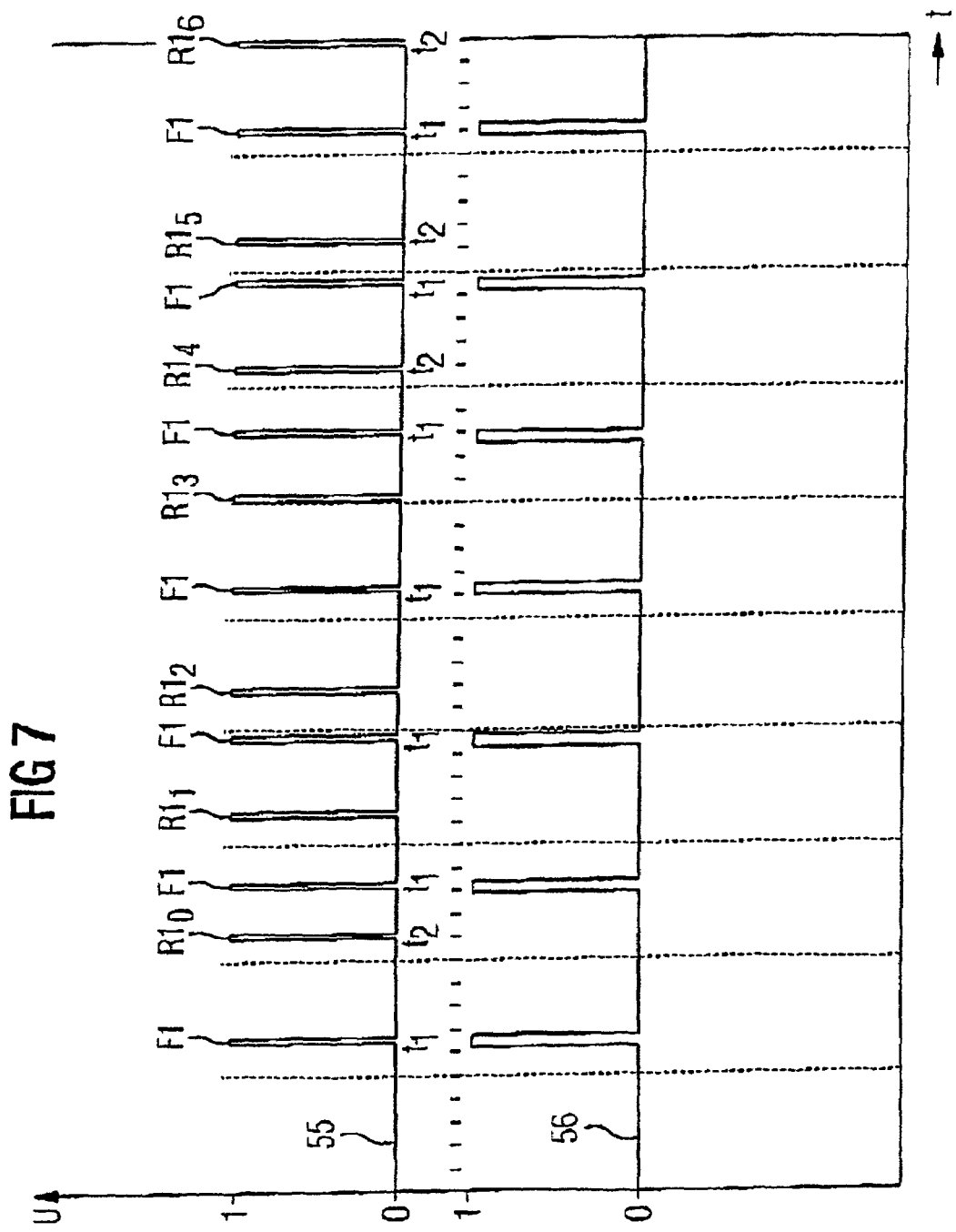

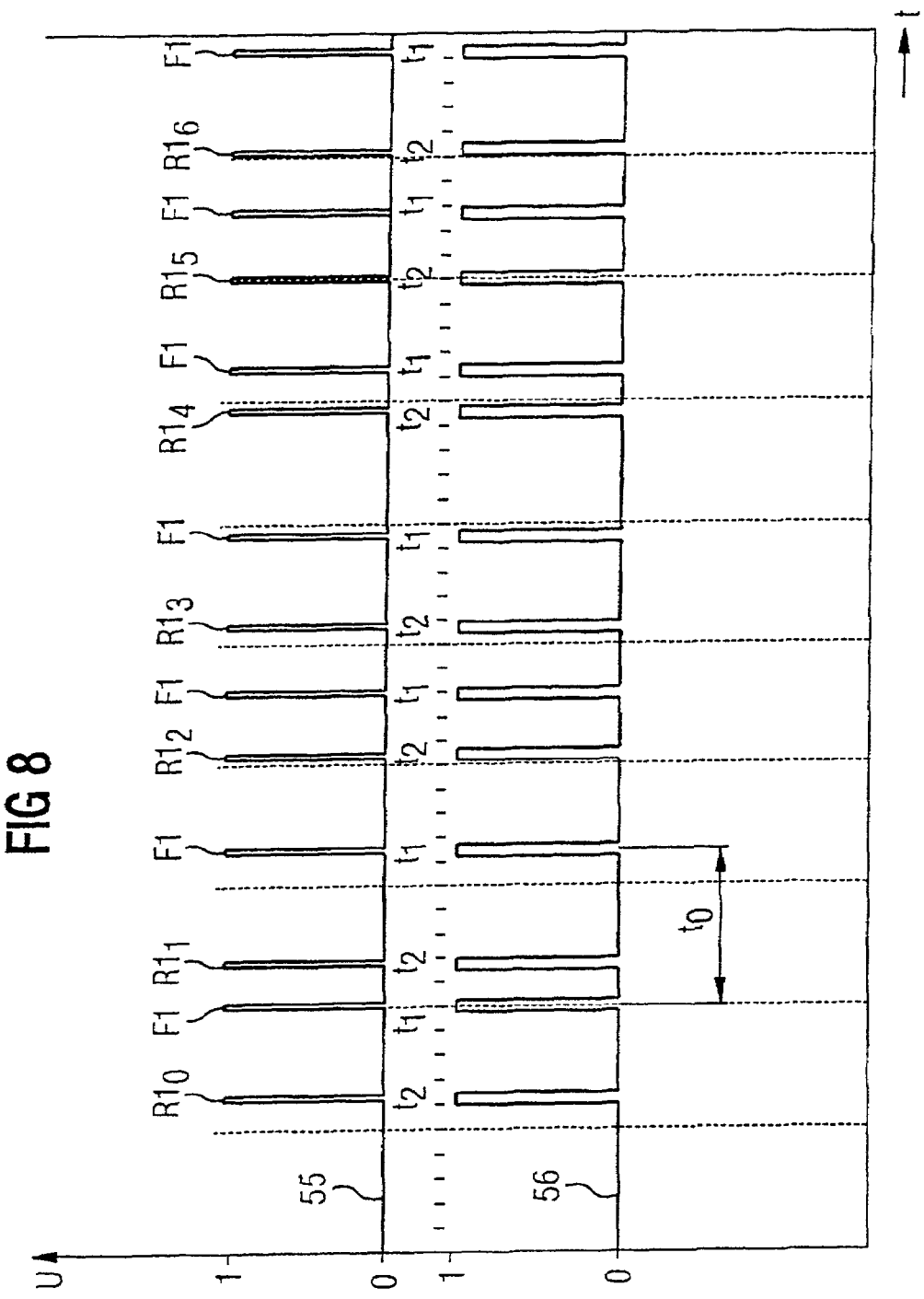

TRANSMITTER, RECEIVER, COMBINED TRANSCEIVER, AND RADIO LINK FOR COMMUNICATING A DATA STREAM OF DATA PACKETS, METHOD FOR RECEIVING A DATA STREAM OF DATA PACKETS, METHOD FOR OPERATING A RADIO LINK, AND BICYCLE AND FITNESS COMPUTERS UTILIZING THE TRANSMITTER AND RECEIVER

CROSS-REFERENCE TO RELATED APPLICATION

This application is a continuation of copending International Application No. PCT/DE00/04411, filed Dec. 11, 2000, which designated the United States and which was not published in English.

BACKGROUND OF THE INVENTION

Field of the Invention

The invention relates to a radio link. In particular, the invention relates to radio links including a number of transmitters and one receiver, in which a data stream of data packets can be transmitted from the transmitters to the receiver.

The problem with such radio links is that transmission errors frequently occur, particularly when all transmitters are transmitting at the same time. In each case individual data packets are then disturbed so that no correct transmission of the data stream between the transmitters and the single receiver can be established.

To solve this problem, a bi-directional data transmission could be provided on the radio link in which it is guaranteed that only any one transmitter communicates with any one receiver at a particular time. However, this method consumes energy so that it is not applicable to battery-operated transmitters and receivers.

SUMMARY OF THE INVENTION

It is accordingly an object of the invention to provide a radio link and method for operating that overcomes the hereinafore-mentioned disadvantages of the heretofore-known devices of this general type and that provide for reliable and energy-saving data transmission.

With the foregoing and other objects in view, there is provided, in accordance with the invention, a transmitter, in particular, has an input unit for inputting and generating each data packet or record or data item and a transmitter control unit for processing the data packet and for inserting a predetermined test coding, resulting from the content of the data packet, into the data packet. Furthermore, a transmitting unit that can be operated by the transmitter control unit for transmitting the data packet is provided. The transmitter is constructed to transmit the data packets regularly in succession.

The signals of such a transmitter can be sampled by a receiver in a particularly simple manner. In the simplest case with only one transmitter, only a single activity of the transmitter needs to be detected in order to predict the further activities of the transmitter. In systems having a number of transmitters, the transmitting times of the transmitters can be predicted just as simply if all retransmission times of the transmitters existing in the radio link have been previously reported to the receiver. The receiver then only needs to detect the activities on the radio link and attempt to receive data packets at the possible subsequent times and at multiples of the retransmission times. A transmission method clocked in this manner can be advantageously used in such radio links in which it is of no particular importance whether each data packet of the data stream is transmitted or not. The invention can thus be used particularly well in radio links for transmitting measurement values in which the transmitted measurement value changes only very slowly in comparison with the frequency of transmission of the measurement values.

Providing a predetermined test coding, resulting, in particular, from the content of the data packet transmitted in each case, in the data packet makes it possible to distinguish data packets transmitted correctly from defective data packets in a simple manner so that only error-free data packets need to be processed further by the receiver.

In correspondence with the transmitter as claimed in the invention, the receiver of the radio link as claimed in the invention has a receiving unit for receiving data packets and a receiver control unit connected to the receiving unit. The receiving unit processes the received data packets and then outputs them. The receiver control unit can determine each test coding of a data packet and from a comparison of the test coding with the content of the data packet it is possible to determine whether this is an error-free or an errored reception of the data packet. When an errored data packet is received, the relevant data packet is discarded.

The receiver as claimed in the invention is constructed in such a manner that times for an expected reception of one data packet each can be determined. This can be done, for example, by sampling all activities on the radio link from time to time and a particularly energy—saving use of the receiver is made possible if the sampling is only for whether there is an activity at all. At predetermined time intervals, an attempt to receive data packets is then made from the time that an activity has been detected. Such a simple solution presents itself particularly if the time intervals between the data packets transmitted by the respective transmitters are known to the receiver.

In a further development of the invention, the transmitter control unit is constructed in such a manner that at least one duplicate of the data packet can be generated, the data packet and/or the duplicate in each case exhibiting a type information item. Using such a type information item, the receiver can detect whether the received data packet is itself a data packet or a duplicate of a data packet.

The transmitter is constructed in such a manner that one data packet and one duplicate can be transmitted regularly in succession. Furthermore, the time offset between each data packet and its duplicate can be varied in accordance with a predetermined offset rule and an offset information item. The offset information item can be provided in a data packet or in a duplicate. Due to the transmission of one or more duplicates of the transmitted data packet, the receiver, when receiving a defective data packet, can also procure the data contained in the data packet from the duplicate transmitted thereafter. When a number of duplicates are transmitted, the receiver is then provided with a number of possibilities for reconstructing the defective data of the data packet. The time offset between each data packet and its duplicates is known both to the transmitter and to the receiver in accordance with the offset rule. In a particularly simple embodiment of the invention, the receiver can predict the expected time of reception of all subsequent duplicates based on a single offset information item in a single data packet alone. This results in particularly reliable operation because it is only necessary to transmit few information items about the time sequence of the transmission of data packets and duplicates.

The offset information can be generated from a predetermined counting sequence, particularly by using a count with which the data packets transmitted by the transmitter are counted. It is not necessary at the receiver end for each data packet transmitted by the transmitter to be really received because the times at which data packets are to be transmitted are known to it. The receiver can thus also operate the counter without really having to receive all transmitted data packets. Nevertheless, the relative position between duplicates and data packets can still be reconstructed by it because the count carried out by it is always current.

Providing a type information item in the data packet and in the duplicate, respectively, enables the receiver to distinguish between data packets and duplicates in a simple manner at any time. This is particularly successful when a transmitter as claimed in the invention and a receiver as claimed in the invention acquire lock at the beginning of operation of the radio link.

Furthermore, an identity information item that can contain an information item on the type or significance of the data packets and that is allocated to the associated transmitter can be provided to each data packet and its duplicate, respectively. Within the radio link, a particular sub-ID of the respective transmitter can thus be allocated to a transmission rate or to a transmission pattern of the data packets. In addition, a significance of the data transmitted with the data packets can be allocated to a particular sub-ID. This makes it possible to distinguish transmitted speed data from transmitted link data in a simple manner. The identity information item can also contain a part of an unambiguous information item about the respective transmitter. This makes it possible to determine in a particularly simple manner within the radio link whether the transmitters switched on in the radio link also really belong to the system provided. Transmitters belonging to another system with another radio link can thus be detected in a particularly simple manner and the reception of the unwanted data from these systems can be suppressed thereafter.

As claimed in the method as claimed in the invention, a search mode and a transmission mode are provided for receiving a data stream exhibiting data packets. In the search mode, the following steps are executed:

sampling the data stream for the presence of data packets, and predetermining times for an expected reception of each further data packet.

In such a search mode, it is sufficient, in the simplest case, to sample for activities caused by data packets on the radio link. Times for the reception of further data packets after a first data packet sampled are then obtained from multiples of a previously known interval time between the respective data packets which are added to the time of reception of the first data packet. In the transmission mode, one data packet in each case is then selectively evaluated and from a comparison of the test coding with the content of the data packet a determination is made whether this is an error-free or an errored reception of the data packet. In the selective evaluation as claimed in the invention, a receiver performing the method as claimed in the invention can be selectively switched off or on.

The method as claimed in the invention can be advantageously improved in that the data stream is sampled for the presence of duplicates belonging to the data packets. If subsequently an offset rule for a time offset between data packets and duplicates is determined from at least one offset information item taken from the data packets and/or their duplicates, increased transmission reliability is obtained. When a defective data packet is received, the transmitted information item can then still be taken from the duplicate.

A particularly energy-saving operation of the device as claimed in the invention is obtained if the transmitting unit can be switched between a switched-on state and a state with reduced energy consumption. The transmitting unit is preferably selectively kept in the switched-on state when data packets or duplicates are transmitted. At times at which no data packets or duplicates are transmitted, the transmitting unit is kept in the state with reduced energy consumption or even completely switched off. As a result, transmission energy can be saved to a large extent.

In just the same way, the receiving unit of the receiver can also be switched between a switched-on state and a state with reduced energy consumption, and the receiving unit can kept in the switched-on state at times at which a reception of a data packet or of a duplicate is to be expected. In contrast, the receiving unit is kept in the state with reduced energy consumption at times at which no reception is to be expected. As claimed in the invention, the receiving unit can be selectively switched off for a predetermined time, for example during a hold mode in which the radio link does not need to be operated. Independently of this, it is conceivable that the calculation of the expected receiving times for data packets or their duplicates, performed at the receiver end, is performed even when the receiving unit is switched off so that the radio link can be operated in synchronized mode again by simply starting up the receiving unit.

In a particular embodiment, the receiver is constructed in such a manner that an identity information item allocated to the transmitter of the data packet or of the duplicate can be decoded from each data packet or from each duplicate, respectively. In particular, this is used for determining the time interval between two data packets, which is determined by data packets having matching identity information items. This makes it possible to achieve a particularly fast and accurate synchronization of the radio link.

To determine the times for an expected reception of a data packet, a signal supplied to the receiver control unit by the receiving unit can also be repetitively selectively evaluated in a search mode of the receiver. A selective evaluation can include, for example, in that the signal output by the receiving unit is checked for activities at regular intervals. Using the receiver as claimed in the invention, times for an expected reception of one data packet each is calculated from a starting time on reception of a first data packet and from a predetermined interval time which, in particular, can be reconstructed from the content or from the position in time of the first data packet. It is also possible to reconstruct the interval time between two successive data packets directly from the received data packet, for example by evaluating a particular identity such as the sub-ID. This results in fast and economic calculation of the regular interval time between two successive data packets.

In deviation from the method explained above for finding the interval time between two successive data packets, times for an expected reception of each data packet can also be calculated from an interval time between two data packets which is determined from a starting time on reception of the first data packet and from a retransmission time on reception of a further data packet.

The invention is also realized in a combined transceiver module for a radio link which exhibits a transmitter and/or a receiver as claimed in the invention. To prevent collisions of data packets or their duplicates, the receiver and the transmitter can also be operably connected to one another. In this configuration, the receiver, when sampling a data packet transmitted from another transmitter, can temporarily suppress the transmitter connected to it or cause it to transmit data packets with changed time interval.

The invention also includes methods for operating a radio link as claimed in the invention which include the methods as claimed in the invention for transmitting a data stream and for receiving a data stream.

Using the radio link as claimed in the invention, long-term operation of transmitter and receiver is possible when they are fed from batteries. This results in possible uses, particularly in conjunction with sports watches that evaluate speed and heartbeat sensors. The system as claimed in the invention can be advantageously used in unidirectional and bi-directional systems that in each case consist of a receiver and a number of transmitters. The system as claimed in the invention has high immunity against transmitters of similar neighboring systems and against mutual collisions of the transmitters of a system. Another result is high noise immunity from irradiation from extraneous sources. Finally, from the point of view of an end user, simple start-up and uncomplicated operation is guaranteed.

In the protocol as claimed in the invention, the information is transmitted in the form of repetitive transmit packets having typically 8 to 16 data bits and various control and test bits. In addition, a numerical sequence generator can provide transmit packets distributed over the time domain redundantly to the regular transmit packets following one another at fixed intervals. After a synchronization phase, the position of all incoming packets can be calculated for the receiver. Selective switching-on and -off of the receiver and of the transmitter results in low current consumption.

The invention can be used particularly advantageously in applications that require unidirectional transmission of data at a low data rate. This results in advantages in long-term operation such as, for example, during the monitoring of measurement data which change at a rate of a few Hertz. After a short preliminary synchronization time, a transmission of data is possible with the invention. A short-term operation, such as the remote control of devices, can be achieved with additional procedural expenditure.

Systems having a number of transmitters which are to be received by a receiver with as uniform a rate as possible in spite of the occurrence of collisions between data packets and other disturbances can be achieved by the redundancy functions as claimed in the invention and, at the same time, with extremely economical long-term battery operation. This includes, for example, sports computers, medical devices for patient monitoring, alarm systems, surveillance systems in the industrial and home user area and transmissions of measurement data.

Especially in the case of sports computers, the invention results in an improved transmission protocol by which a single receiver can be used for all transmitters of a system. All transmitters are then transmitting on a common frequency and a maximum number of 4 or 6 or 8 transmitters has been found to be successful. The invention makes it possible to achieve a high transmission rate within a predetermined time frame and collisions between the various transmitters or sensors of a system are prevented. The radio link as claimed in the invention has high noise immunity to atmospheric disturbances and transmitters of other systems. The invention also results in a very low mean activity of the receiver and transmitter chips, resulting in low current consumption of the radio link.

The invention also comprises a protocol for a data transmission in which data words are converted into one or more data packets before the transmission. Each transmitter of the radio link has an in each case different sub-ID which provides the respective sensor type within a system. Thus, sensors for heartbeat, for a wheel revolution or for a pedaling frequency can be distinguished by the sub-ID. In addition, each transmitter module has a unique ID or also serial number independently of the sub-ID. This is written into a nonvolatile memory area of the transmitter, for example during a production test, or determined in accordance with a random principle when a new battery is inserted. Each sub-ID is assigned a particular fixed packet retransmission time or packet frequency. The packet frequency is independent of the respective frequency at which the measurement values arrive or change. In parallel to the term packet frequency, the term time slot can also be used. This is a pattern of time intervals that correspond to the packet length. The interval between two packets of a transmitter is always an integral number of time slots. The packet interval of the individual sub-IDs always differs by an even number.

To prevent collisions within a system of a radio link, it is intended for it to be achieved that the collision of the packets of each transmitter with packets of another transmitter of the same system is interrupted for no longer than one packet in sequence. Depending on the sub-ID, the transmitters as claimed in the invention have a different fixed packet frequency which they obtain by a coding within the system. This coding varies in steps in such a manner that the length of the period of the packet frequency in each case increases by twice the packet length from transmitter to transmitter. It is easy to comprehend that no two packets in sequence can really collide in the case of two transmitters which have two different packet frequencies.

In principle, however, it applies that with a number N of transmitters, N-1 packets of one of the transmitters can be disturbed in sequence in the worst case.

However, this case is improbable and of lower significance in reality. So that a prescribed maximum transmission time is not exceeded, the frequency of the transmitted packets could then be multiplied by N. In the case of four transmitters, four times more packets per second would have to be transmitted in this case than in the case of a "normal" data transmission. However, this necessitates an increase in current consumption at the transmitter and receiver. As claimed in the invention, a similar effect is achieved with reduced expenditure.

From the sum of all packet frequencies and the respective packet duration, the throughput of the entire time slice with transmit packets is calculated. This parameter, which can also be called "occupancy", provides a measure of the resistance of the system to disturbances extraneous to the system. The more packets are under way on the radio link and the longer they are in each case, the higher the probability that a short noise pulse will collide with one of these packets.

To prevent a collision between two transmitters of neighboring radio links radiating across in each case, a packet with variable position or, respectively, a redundant packet can also be transmitted between two fixed packets in each case at each transmitter in addition, to the fixed packets which are transmitted and received with constant frequency in each case. The time slot into which the redundant packet is placed is determined by a numerical sequence generator, the sequence of which can be dependent on the ID of the respective transmitter. The algorithm for the numerical sequence is known both to the transmitter and to the receiver. After a synchronization period, the respective IDs of the individual transmitters are also stored in the receiver so that these, too, can be used as parameters in the numerical sequence. The transmitter is thus able to calculate in advance in which time slot the next redundant packet can be expected and correspondingly switch on the receiving device at the precise time. A start information item for the numerical sequence generator, which is in each case transmitted in a data packet, identifies a zero transition of the numerical sequence so that transmitter and receiver can be synchronized by means of this data packet.

The ID of the transmitter is periodically transmitted within the data packets, in each case piece by piece. Overall, it is only necessary to transmit as many components of the serial number as are used for individualizing the numerical sequence passing through from the numerical sequence generator. This accelerates the transmission of the ID or serial number of the transmitter.

When the receiver locks to a transmitter and scans all existing sub-IDs of the system, an attempt is made to switch on the receiver chip as rarely as possible in order to keep the current consumption below a predetermined value in order to save a battery. When all transmitters are active, the receiver is in the basic state. As soon as the receiver is activated by the user, it begins to search for transmitting activity at short intervals over the length of a period of the packet frequency. The "comb" formed during this process must be so narrow that no unnoticed packets can come to lie between the individual "tines". A single peak for searching for transmitting activity is shorter than the length of one data packet here. The coarse position of the transmitting activities found makes it possible to determine where next to look for transmit packets.

In the next pass, an attempt is made to receive complete transmit packets at the precalculated times. As soon as it has been possible to correctly receive a fixed packet matching the sub-ID of the receiver looked for in each case, the receiver is capable of synchronizing to the fixed packets of this transmitter. Following this, the serial number is reconstructed from the individual bits of the serial number transmitted serially in various data packets. This finally provides the receiver with all information also to find the redundant packets accurately, if necessary. If no activity was found in the radio link during the scanning of the time slice, the process is repeated once or twice and then terminated.

Before a receiver of a radio link knows which transmitters of the radio link are to be included in its radio link due to their IDs, it must receive the IDs of the respective transmitters correctly at least once and permanently store them. For this purpose, a corresponding mode is selected in the receiver and at the same time ensured that all transmitters of its system are active. It must also be ensured that no transmitters of a second similar system are producing crosstalk. Given such a state, the IDs can be learnt reliably.

In normal operation, the receiver as claimed in the invention switches on at the respective reception time of the fixed packets and disregards the redundant packets. If a fixed packet is received errored or cannot be received due to extraneous disturbances or collisions in the radio link, the receiver attempts to replace the missing fixed packet by the next redundant packet in the sequence or by other redundant packets. This is achieved with the aid of the numerical sequence, known at both ends, for calculating the position of the redundant packets in time. When the disturbances of the radio link stop again, the receiver again restricts itself to receiving fixed packets. This keeps the current consumption down.

When the transmitters of a radio link and the receiver lock on or when the receiver wakes up out of a mode with reduced energy consumption, it can also respond to the transmitters of a neighboring system. However, it is possible to determine whether the transmitters found on lock-on belong to its own system or not via the IDs of the system transmitters, learnt in a special mode.

The mean current consumption in the receiver is calculated from the mean activity. This is the percentage of time during which the receiver is switched on in the mean. In addition, the power consumption is determined from the current consumption in active mode. The activity is calculated from the sum of all packet frequencies multiplied by the switched-on period needed for receiving one packet. The low activity of the system as claimed in the invention is achieved by the fact that the receiver in loaded operation between receiver and transmitter knows accurately when it can expect the next fixed packet of any transmitter from its system. As a result, the receiver can be switched on precisely for the period of time needed for receiving one packet. An active current consumption of 4 mA in the receiver and a switched-on period of 3 msec and a packet frequency of 1 Hz per transmitter for the fixed packets and a total of four transmitters result in an activity of 1.2%. This results in a current consumption of 48 µA. The minimum current consumption which can be achieved also depends on the technology of the available receiver chips.

The transmitters can be constructed as microcontrollers with internal EEPROM for the ID number. The respective sub-ID and the packet frequency of the system can be permanently adjusted via external pins or configured by means of entries in the EEPROM. The ID is read in from the EEPROM after a reset or generated in accordance with the random principle. For test purposes, the entire ID is transmitted once shortly after the reset. When microprocessors with integrated EEPROM are used, the ID can also be written serially into the chip during the test and checked for correct writing by means of a repeated reset.

The program for controlling the microcontroller operates in accordance with the method as claimed in the invention. It can be structured as follows. There is a total of two interrupts which can be triggered by a timer or by the test value transmitter. The timer interrupt must have the higher priority and is derived, for example, from a stable crystal clock with a frequency of 33 kHz. The serial transmission of the packets requires a processor clock of approximately 150 kHz to 300 kHz for a short time. If no interrupt is being served, the processor goes to sleep.

After a reset, the program jumps either to the test mode or to the ID search mode. The test mode performs actions which can serve a production test and then stops. The ID search mode, in which a random number is generated as ID of the transmitter, is followed by the active mode after the first test interrupt. In the active mode, measurements are made and transmitted. The active mode changes into a zero mode if no further measurement pulses have been registered over a short period. When it is sure that "zero" has been transmitted for a sufficiently long period, the standby mode is activated and the transmission is switched off. The timer interrupt continues to run. After an additional time of the order of magnitude of a number of hours, the power-down mode begins. In this case, the processor switches off the timer interrupt. The ID is retained in the transmitter.

The routine transmitting the data packet is time-critical and is written in assembler. The test interrupt has a lower priority than the timer interrupt. When the test interrupt occurs, the next measurement value is determined and the next packet is processed. When the new packet is ready, a pointer is shifted from the old packet to the new packet. The timer interrupt must not be switched off in standby mode. Only an interrogation is necessary which bypasses the transmission of the packet.

If a watchdog is activated, it must be regularly served, for example in timer interrupt or even in test interrupt. In the power-down mode, the watchdog continuously cycles until a test interrupt occurs again at some time. This causes no damage and is unobjectionable from the point of view of current consumption.

The invention is also implemented in a bicycle computer which exhibits at least one transmitter as claimed in the invention and one receiver as claimed in the invention. In particular, it can be connected to a sensor for measuring wheel rotations of a cycle wheel, with a sensor for measuring pedal rotations or with a sensor for measuring the resistance to movement of the bicycle, and the receiver can also have a display for indicating the value transmitted by the sensor. Such a bicycle computer can be operated in a particularly reliable manner and accurate measurement results are always indicated.

Finally, it is also conceivable to provide the radio link as claimed in the invention in a fitness computer in which a transmitter can be connected with a sensor for measuring the heartbeat of a user or for measuring his or her stepping rate. Such a fitness computer can have a receiver with display for indicating the value transmitted by the sensor.

Other features that are considered as characteristic for the invention are set forth in the appended claims.

Although the invention is illustrated and described herein as embodied in a radio link and method for operating it, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a diagrammatic view showing the signals output by the transmitters from FIG. 1 with regard to their sequence in time;

FIG. 6 is a graph plotting potential versus time during a locking mode of the receiver from FIG. 1 in a second signal situation;

FIG. 7 is a graph plotting potential versus time during an operating mode of a receiver from FIG. 1; and FIG. 8 is a graph plotting potential versus time during another operating mode of the receiver from FIG. 1.

DESCRIPTION OF THE PREFERRED EMBODIMENTS

Figure 1:
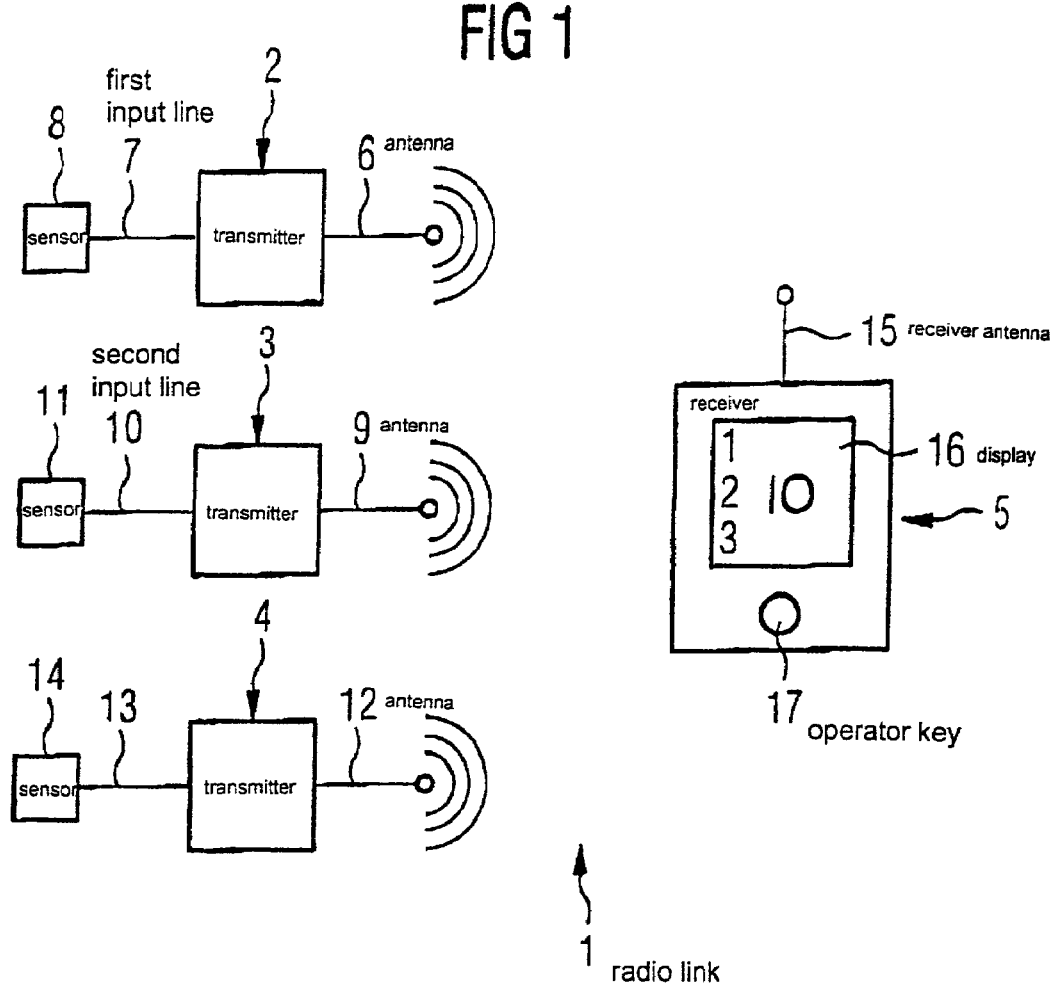
FIG. 1 is a diagrammatic view showing a radio link having three transmitters and one receiver.

Referring now to the figures of the drawings in detail and first, particularly to FIG. 1 thereof, there is shown a diagrammatic representation of a radio link 1. The radio link 1 includes a first transmitter 2, a second transmitter 3, a third transmitter 4, and a receiver 5. The first transmitter 2 has a first antenna 6 for transmitting radio signals. The first antenna 6 is connected to a transmitting unit, not shown in this view, which generates the radio signals to be transmitted by the first antenna 6. Furthermore, the first transmitter 2 includes a transmitter control unit, not shown in this view, for driving the transmitting unit. The transmitter control unit receives signals via a first input line 7 from a first sensor 8. The first sensor 8 is constructed as revolution counter of a running wheel, not shown in this view. The first sensor 8 thus supplies position information about the running wheel via the first input line 7 to the transmitter control unit. The transmitter control unit converts this position information into digital data and causes the transmitting unit to transmit these digital data via the first antenna 6.

The second transmitter 3 has a second antenna 9 and a second input line 10 and essentially corresponds to the first transmitter 2 with regard to its remaining configuration. The second transmitter 3 receives signals via the second input line 10 from a second sensor 11. The second sensor 11 evaluates position information about a pedal, not shown here, of a bicycle. The second transmitter 3 converts this position information into digital signals that are output as radio signals via the second antenna 9.

The third transmitter 4 includes a third antenna 12 and a third input line 13 via which data are accepted from a third sensor 14. With regard to its remaining configuration, the third transmitter 4 essentially corresponds to the first transmitter 2. The third sensor 14 determines the heart rate of a person, not shown in this view, who is traveling on a bicycle. This heart rate is converted into digital data by the third transmitter 4 and output as radio signal via the third antenna 12.

The receiver 5 has a receiver antenna 15 for receiving the radio signals output by the first transmitter 2, the second transmitter 3, and the third transmitter 4. The radio signals received by the receiver antenna 15 are forwarded to a receiving unit, not shown in this view, which is operably connected to a receiver control unit, also not shown in this view. The receiving unit can be switched on and off by the receiver control unit. The receiver control unit can also place itself into a switched-off state. The receiver control unit converts the data accepted by the receiving unit and indicates them on a display 16. It is possible to indicate on the display 16 from which transmitter the data indicated on the display 16 have been transmitted.

In addition, it is also possible to indicate the contents of the respective data. Furthermore, the receiver 5 has an operator key 17. The operator key 17 enables a user to operate the receiver control unit.

In operation of the radio link 1, the first transmitter 2, the second transmitter 3, and the third transmitter 4 continuously repetitively transmit data which are received by the receiver 5, evaluated and indicated on the display 16.

FIG. 2 illustrates the radio signals, output by the first transmitter 2, the second transmitter 3, and the third transmitter 4, with regard to the sequence in time of the data transmitted by them.

FIG. 2a shows a first time axis 20 which contains a first fixed packet F1 and a first redundant packet R1. The first fixed packet F1 and first redundant packet R1 are formed by, in each case, one data signal, which are modulated onto a carrier signal with a carrier signal frequency. In principle, any modulation method can be used for this purpose.

As can be seen especially well in FIG. 2a, the transmission of the first fixed packet F1 begins at time $t_1$. The transmission of the first redundant packet R1 begins at a time $t_2$. The length of the first fixed packet F1 and the length of the first redundant packet R1 essentially correspond to one another.

FIG. 2b illustrates the radio signal output by the second transmitter 3 plotted on a second time axis 21. It includes a second fixed packet F2 and a second redundant packet R2 which are modulated as data signals onto a carrier frequency that identically corresponds to the carrier frequency of the first transmitter 2. The second fixed packet F2 is transmitted at a time $t_1$ and the second redundant packet R2 is transmitted at a time $t_3$. The difference $t_3-t_2$ at the second transmitter 3 is smaller than the difference $t_2-t_1$ at the first transmitter 2. This prevents a collision in time of the first fixed packet F1, the second fixed packet F2, the first redundant packet R1, and the second redundant packet R2, in such a manner that at least one of the data packets per transmitter does not coincide in time with all data packets of the other transmitter.

FIG. 2c illustrates a third time axis 22 on which a third fixed packet F3 transmitted by the third transmitter 4 and a third redundant packet R3 are drawn.

The third transmitter 4 transmits at the same carrier frequency as the first transmitter 2 and the second transmitter 3, the third fixed packet F3 and the third redundant packet R3 being modulated onto a corresponding carrier signal. As can be seen particularly well in FIG. 2c, the transmission of the fixed packet F3 begins at time $t_1$ and the transmission of the third redundant packet begins at time $t_4$. The time difference $t_4-t_1$ of the third transmitter 4 differs from the corresponding time differences $t_3-t_1$ of the second transmitter 3 and $t_2-t_1$ of the first transmitter 2.

FIG. 2d illustrates the time interval $t_0$ between two fixed packets F1 of the first transmitter 2 by means of the first time axis 20. The interval $t_0$ is essentially identical between any two successive fixed packets F1. Accordingly, the fixed packets F1 are transmitted at regular time intervals.

FIG. 2e illustrates the time interval $t_{0'}$ between each two second fixed packets F2 of the second transmitter 3 on the second time axis 21. The second fixed packets F2 are transmitted by the second transmitter 3 at regular time intervals.

FIG. 2f illustrates the third fixed packets F3 output by the third transmitter 4 on the third time axis 22. The third fixed packets F3 are in each case transmitted regularly in succession with a time interval $t_{0''}$.

The respective time intervals $t_0$, $t_0'$, and $t_0''$ differ from one another so that in most cases, the fixed packets transmitted by the first transmitter 2, by the second transmitter 3, or by the third transmitter 4 do not overlap in time. This makes it possible to operate a number of transmitters together with a single receiver.

Figure 3:
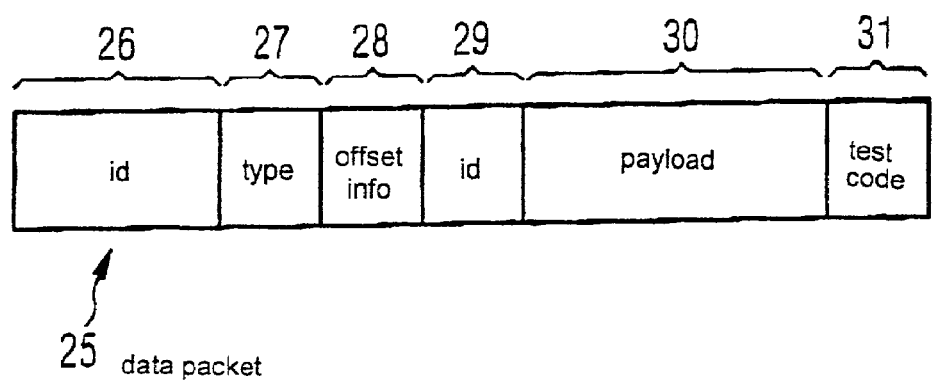
FIG. 3 is a diagrammatic view of a data packet, or of its duplicate, output by the transmitter from FIG. 1.

FIG. 3 illustrates the structure of a data packet 25, the structure of which essentially corresponds to that of the first fixed packet F1, of the second fixed packet F2, of the third fixed packet F3 and, respectively, to the first redundant packet R1, to the second redundant packet R2, or to the third redundant packet R3. The data packet 25 is structured into a first identification area 26, into a type area 27, into an offset information area 28, into a second identification area 29, into a payload area 30 and into a test code area 31.

The first identification area 26 is used for accommodating information which specifies the so-called sub-ID of the respective transmitter. The sub-ID of the respective transmitter can accommodate an information item on the time offset between a fixed packet transmitted by the transmitter and the corresponding redundant packet. Similar to issuing channels in the case of radio links which utilize predetermined bandwidths of radio signals, time slice areas can thus be utilized when using a single predetermined transmission frequency. The time slice areas thus defined are advantageously unambiguously identified and—in each case allocated to one transmitter—reproduced in the first identification area 26 of a fixed packet or redundant packet transmitted by the relevant transmitter.

The type area 27 accommodates information about whether the respective data packet is a fixed packet or a redundant packet.

The offset information area 28 remains unused in the case of simple operation of the radio link 1 without redundant packets. In an advantageous further development, the information contained in the offset information area 28, together with the information in the first identification area 26, provides information on the time interval in which the redundant packet following a fixed packet will appear. For this purpose, a mathematical rule or a counting sequence, respectively, can be provided in the corresponding transmitter of the data packet 25, as claimed in which the time interval between fixed packet and the redundant packet transmitted following the fixed packet is established. If such a sequence is controlled via a counter, the respective count can be registered in the offset information area 28 and transmitted.

The second identification area 29 can be used for accommodating a serial number which is issued only once in each case. The second identification area 29 allows a transmitter of the radio link 1 to distinguish from a transmitter of another radio link.

The payload area 30 accommodates the data to be transmitted by the radio link 1.

When the data packet 25 is received, the test code area 21 is used for determining whether the transmitted data have experienced unwanted changes in the meantime. To generate the content of the test code area 31, it is possible to use, for example, a parity method or a checksum method.

Furthermore, the data packet 25 exhibits scanning, synchronization and starting data, not shown in this view, which, in particular, are necessitated by the machine processing of the data packet 25 and are correspondingly designed.

Figure 4:
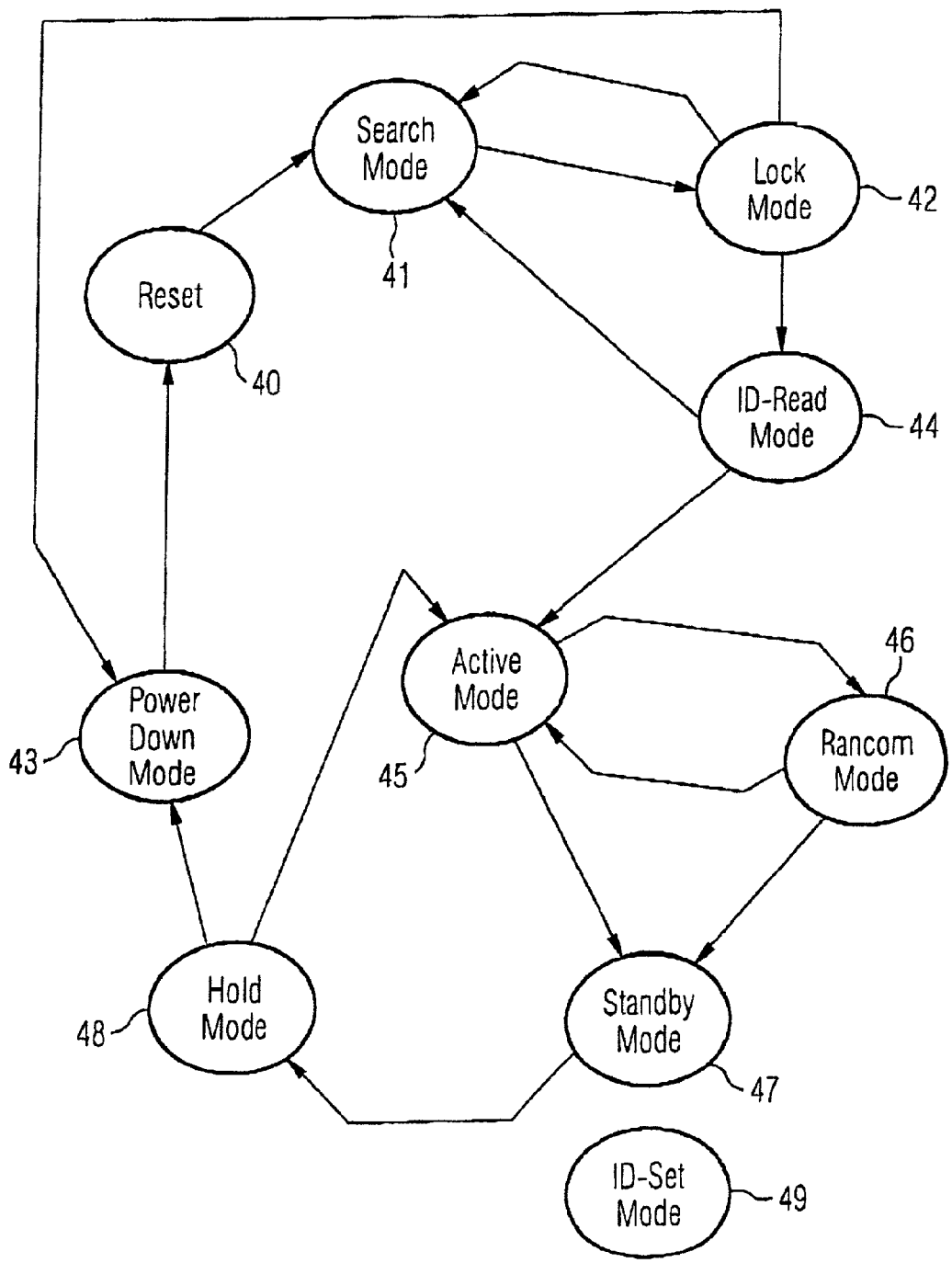
FIG. 4 is a flow chart illustrating the operation of the receiver from FIG. 1.

FIG. 4 shows a flowchart that describes the behavior of the receiver 5 in its various operating modes. In particular, the transitions between its individual operating modes are illustrated.

In an initial state of the receiver 5, it is placed into a reset mode 40 by pressing on a reset key, not shown in FIG. 1. In the reset mode 40, the software and hardware modules of the receiver 5 are initialized. Starting from the reset mode 40, the receiver 5 then changes into a search mode 41 if the operation of the receiver 5 is to be normal.

In the search mode 41, the timing pattern for the fixed packets F1, F2 and F3 of the first transmitter 2, of the second transmitter 3 and of the third transmitter 4 within the radio link 1 is determined. For this purpose, a list with individual times for the reception of in each case one fixed packet of a transmitter is set up. The receiver 5 scans with many short activities a period which corresponds to a maximum time interval between two fixed packets of a transmitter contained in the radio link 1. During this process, the activities on the radio link 1 are detected. In most cases, exactly one fixed packet from each transmitter will be scanned within this period. The respective duration of the individual scans should be greater than the maximum time free of transmitting activity occurring within a data packet. The interval between the individual scans is preferably kept slightly shorter than one packet length. These scans result in a list of times at which activities of the radio link 1 have been identified. These activities can comprise both fixed packets and redundant packets and originate both from the radio link 1 and other radio links, not shown in FIG. 1. In addition, radio interference can also be scanned.

In an embodiment not shown in FIG. 4, the program, starting from reset mode 40, can also branch into a test mode. The test mode is intended for a special operation of the receiver 5 following its manufacture. In the test mode, it is possible to test individual functions of the receiver 5. For this purpose, a special operation of the receiver 5 is set up. From the test mode, it is only possible to jump back into the reset mode 40.

Starting from search mode 41, the receiver 5 changes into a lock mode 42 in which fixed packets of in each case the first transmitter 2, the second transmitter 3 and the third transmitter 4 are searched at the times precalculated in the search mode 41. To precalculate the times of reception of one fixed packet of each of the transmitters existing in the radio link 1, use is made of the fact that the fixed packets received in search mode 41 contain in the respective first identification area 26 an unambiguous information item about the regular time interval in which the fixed packets of one transmitter each are transmitted. After receiving a fixed packet transmitted by a transmitter, the reception of the next fixed packet can be predicted in a simple manner. Thus, the receiver 5 can lock the fixed packets of the respective transmitter as soon as one fixed packet each matching the wanted sub-ID has been correctly received.

Starting from the lock mode 42, the receiver 5 can put itself back into search mode where no fixed packet of a wanted sub-ID has been found in search mode 41.

Finally, it is also possible to branch from the lock mode 42 into a so-called power-down mode 43 if there have been too many successive changes between lock mode 42 and search mode 41. In such a case, proper operation of the radio link 1 is not possible so that both the receiving unit and the receiver control unit can be completely switched off. The receiver 5 can be placed into reset mode 40 from the power-down mode 43 by operating the reset key.

Starting from lock mode 42, the receiver 5 places itself into an ID search mode 44 in which it waits for fixed packets of the transmitters of the radio link 1 in which the respective offset information area 28 has a predetermined content. Using the predetermined content of the offset information area 28, a numerical sequence generator, not shown in FIG. 1, of the receiver 5 can be started which can be used for calculating the respective offset between fixed packet and redundant packet of a transmitter in accordance with a mathematical rule. Moreover, when a predetermined content occurs in the offset information area 28, it is possible to begin to assemble associated contents, transmitted over a number of data packets, of the respective second identification area 29 to form a total information item. The content of the offset information area 28 also provides information on how these successive information items of the respective second identification areas 29 are to be assembled.

In the case where the IDs received during the ID search mode do not match the expected IDs of the first transmitter 2, of the second transmitter 3 and of the third transmitter 4, the receiver 5 returns into the search mode 41.

In the normal case of scanning for the presence of the first transmitter 2, the second transmitter 3, and the third transmitter 4, the receiver 5 changes into an active mode 45. In the active mode 45, which represents the normal operation of the radio link 1, the receiving unit is essentially kept switched off. The receiving unit is only switched on at times at which the receiver control unit expects the expected reception of a fixed packet of one of the transmitters. In active mode 45, the precise position of the received fixed packets is continuously checked and, if necessary relatively small errors in the position calculation are corrected by the receiver control unit. In active mode 45, the data are also transmitted within the radio link 1, evaluated by the receiver control unit and forwarded to the display 16.

Starting from active mode 45, the receiver 5 changes into a redundancy mode 46 if the information contained in the test code area 31 of a received fixed packet indicates during the evaluation of the data packet that the data packet has been transmitted corrupted or incompletely. In redundancy mode 46, the receiving unit is switched on by the receiver control unit if a redundant packet is to be evaluated for a particular ID of one of the transmitters for the fixed packet received corrupted or not at all. The precise position in time of the reception of the redundant packet for the relevant fixed packet is obtained from the numerical sequence tracked in the receiver control unit.

After receiving the corresponding redundant packet, the receiver 5 returns into active mode 45 in which it evaluates successive fixed packets.

Starting from active mode 45 or from redundancy mode 46, the receiver 5 changes into a standby mode 47 if neither fixed packets nor redundant packets are received for a predetermined time of, for example, 3 seconds. In this state, the receiving unit is switched on with a reduced frequency and examined for the presence of fixed packets or redundant packets. This ensures reduced current consumption if the radio link 1 is interrupted, for example by the distance between the receiver 5 and the transmitters being too great. Normal operation of the radio link in active mode 45 or in redundancy mode 46, respectively is resumed when the receiver 5 approaches the transmitters.

Starting from standby mode 47, the receiver 5 changes into a hold mode 48 when a particular period has elapsed since a fixed packet or a redundant packet has last been received. In hold mode 48, the receiving unit remains switched off until the operator key 17 is operated. In this case, the receiver 5 places itself into active mode 45 in which fixed packets can be received immediately at the predetermined times because the receiver control unit has continued to calculate the expected times for the reception of fixed packets. If the program branches from the active mode 45 into the redundancy mode 46 in this state, it is also possible to read in redundant packets immediately because the receiver control unit has also continued to calculate the numerical sequence for the times for the expected reception of one redundant packet each.

If the operator key 17 of the receiver 5 has not been operated when it is in standby mode, the receiver 5 automatically changes out of hold mode 48 into the power-down mode 43 if it has been in hold mode 48 for a particular period. Such a transition from hold mode 48 into power-down mode 43 is also conceivable if the receiver control unit detects that the deviations of the reception times of fixed packets or redundant packets calculated further are too great.

A particular situation for the receiver 5 is represented by an ID-set mode 49 in which the radio link 1 is operated in search mode 41, in lock mode 42, and in ID-read mode 44 shielded against other radio links and interference. In addition to the behavior in the modes listed above, the ID-set mode 49 scans for which transmitters are located in the environment of the receiver 5. Their IDs are then received and permanently stored in the receiver 5. Naturally, it must be ensured that all transmitters of the radio link 1 are active and that no transmitters of a second radio link are interfering with the transmission. The ID-set mode 49 is reached, and left again, by operating an ID-set key, not shown in FIG. 1, of the receiver 5.

Figure 5:
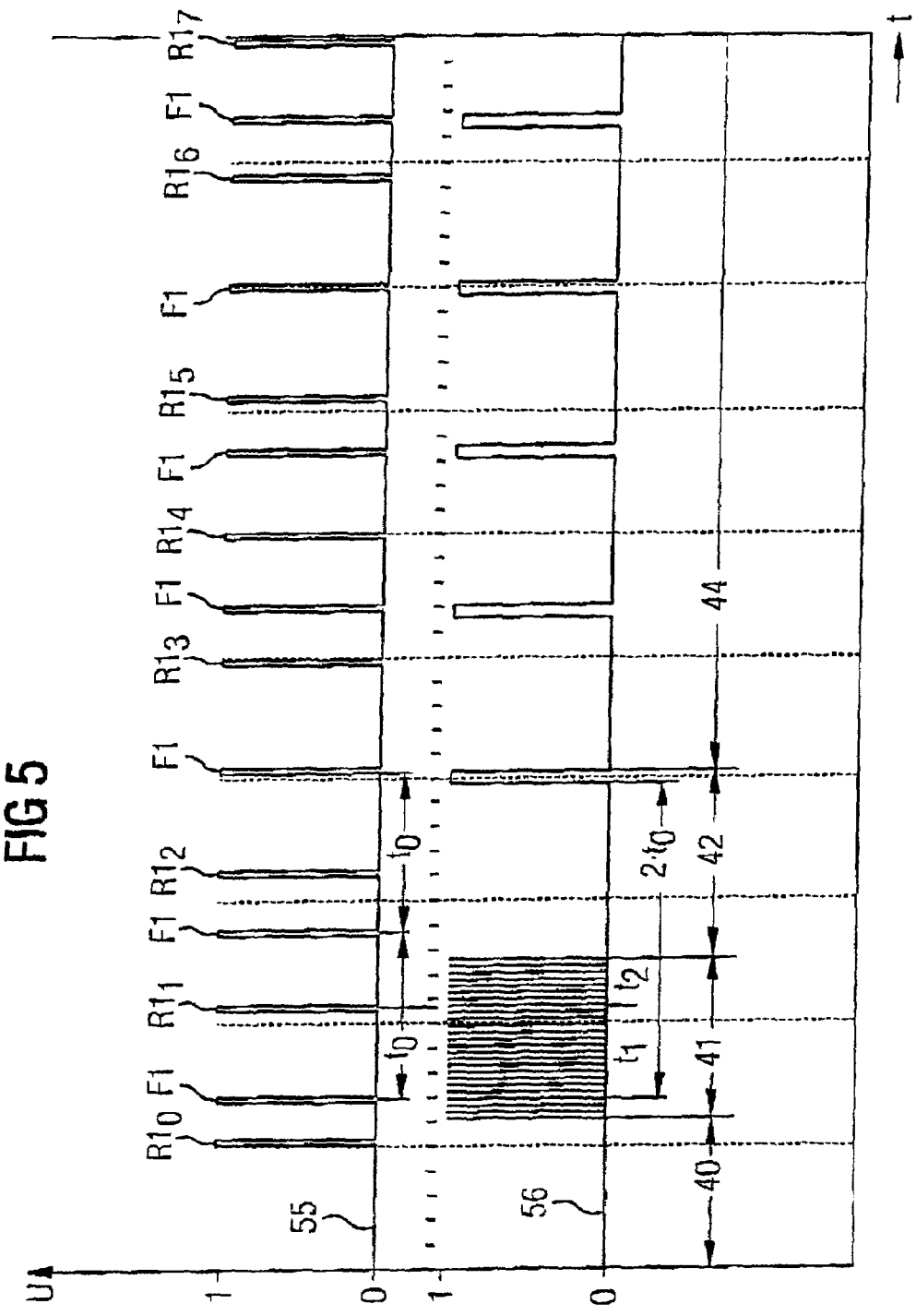
FIG. 5 is a graph plotting potential versus time during a locking mode of the receiver from FIG. 1 in a first signal situation.

FIG. 5 shows a switching-on diagram which illustrates the switching-on times of the first transmitter 2 and of the receiver 5. In the following description of the invention, it is assumed that only the first transmitter 2 is active. The second transmitter 3 and the third transmitter 4 are inactive.

The transmitter curve 55 reproduced in the upper part of the switching-on diagram specifies when the transmitting unit is switched on. At these times, the level of the transmitter curve 55 is at the value "1". At times at which the transmitting unit is switched off, the transmitter curve 55 assumes the value "0". When a fixed packet or a redundant packet arrives which comes from the first transmitter 2, a peak thus appears in the transmit curve 55. Above the respective peaks of the transmitter curve 55, the designations of the first fixed packets F1 and of the first redundant packets R1 are specified. Overall, the transmitter curve 55 exhibits eight redundant packets R1, the index of which is numbered through from "0" to "7". In addition, a total of seven fixed packets F1 are provided, which are spaced equidistantly from one another in time.

The time interval between one fixed packet F1 each and the associated redundant packet R1 is obtained from a count that is continued in accordance with a predefined numerical sequence in the first transmitter 2. As can be seen particularly well in FIG. 5, the time interval between each fixed packed F1 and its associated redundant packet R1 varies.

Below the transmitter curve 55, a receiver curve 56 is shown which indicates the switched-on state of the receiving unit. The switched-on state of the receiving unit is designated by "1" if the receiving unit is in the switched-on state and by "0" if it is in the switched-off state.

Below the receiver curve 56, the individual states of the receiver 5 after activity has been started in the radio link 1 are designated. After the reset key of the receiver 5 has been operated, it changes into the reset mode 40 in which the receiving unit is switched off. The receiver 5 then changes into search mode 41. In the search mode 41, the receiving unit is switched on at regular intervals for in each case a short period that is shorter than the transmission time of a data packet. During the search mode 41, the activities of the receiver 5 are thus not able to produce any evaluations of individual data packets but it is only possible to obtain information about whether some transmitting activities of the transmitters involved can be registered in the radio link 1.

Shortly after the transition from reset mode 40 into search mode 41, the receiver 5 perceives a fixed packet F1 that is transmitted at time $t_1$ as claimed in the diagram in FIG. 2. Shortly after reception of the fixed packet F1, the receiver 5 perceives the redundant packet $R1_1$ at time $t_2$ as claimed in the diagram from FIG. 2. The receiver 5 knows that one of the retransmission times for fixed packets in the radio link 1 is equal to $t_0$ as the interval between two fixed packets F1 of the first transmitter 2. The receiver 5 correspondingly changes from search mode 41 into lock mode 42 and switches on the receiving unit at time $2t_0$ for receiving a data packet. At this time, a fixed packet F1 can be perceived again in the radio link 1 as can be seen in FIG. 5. The receiving unit perceives the fixed packet F1 and evaluates it. From this time onward, the receiver 5 can thus change into the ID search mode in which the successive fixed packets F1 are read in and evaluated at in each case constant time interval $t_0$.

FIG. 6 shows a further locking process in the radio link 1 that corresponds to the locking process from FIG. 5 in essential parts. For this reason, the same components have the same reference numbers. In contrast to the locking process from FIG. 1, however, a redundant packet $R1_0$ is first sampled during the search mode 41, which is followed by a fixed packet F1. Due to the short switched-on period of the receiving device of the receiver 5, the complete data packets are not in each case received but only an activity is in each case detected in the radio link 1. The receiver control unit initially assumes that the first activity sampled is a fixed packet and attempts to read in a complete data packet as further fixed packet at time $2t_0$. FIG. 6 clearly shows that there is no data packet transmitted by the first transmitter 2 for this attempted reading-in process of a data packet so that no data can be received here. The receiving unit concludes from this that the first activity must have been a redundant packet. Furthermore, it follows from this, that the second activity sampled in search mode 41 must be a fixed packet. The receiver control unit correspondingly again switches on the receiving unit at a time $2t_0$ after sampling this second activity. At this time, a fixed packet can be received as can be seen in FIG. 6. From this time onward, the receiver 5 can switch into ID search mode and evaluate the further fixed packets.

FIG. 7 shows a transmission/reception diagram which illustrates the operation of the receiver 5 in active mode 45. In this state, the receiver 5 is locked to the first transmitter 2 so that the receiving unit is switched on at a time $t_1$ each time and the fixed packet F1 transmitted at this time is received and evaluated. For this purpose, the receiver control unit measures at each receiving time $t_1$ the time for the next receiving time $t_1$ and correspondingly switches the receiving unit off and on again.

In this state, the radio link 1 could also be operated without the first transmitter 2 transmitting redundant packets, which is also the subject matter of the invention. This also simplifies the locking process shown in FIG. 5 and FIG. 6.

FIG. 8 shows a transmission/reception diagram when the receiver 5 is operated in redundancy mode 46. In the redundancy mode 46, both the fixed packets F1 and the redundant packets $R1_0$ to $R1_6$ are sampled. As can be seen particularly well in FIG. 8, the time interval between in each case one fixed packet F1 and an associated redundant packet R1 varies.

The receiver 5 and the first transmitter 2 are in locked state so that the receiver 5 already knows when to expect the reception of fixed packets F1 and redundant packets R1. The reception of the fixed packets F1 can be calculated once an reception time of a fixed packet F1 is known by adding the invariable time interval $t_0$ between two fixed packets F1 to the time of reception of the last fixed packet F1.

The time interval between a fixed packet F1 and the following redundant packet R1 is obtained from an offset rule as claimed in a count in the first transmitter 2. For this purpose, a counter is incremented by a particular value with each transmission of a fixed packet in the first transmitter 2. The count uses a predetermined series function as offset rule, including the sub-ID of the first transmitter 2 and including further system parameters, a time $t_2$ is obtained as time displacement with respect to time $t_1$, the time $t_2$ being greater than 0 and less than $t_0$.

The receiver 5 was informed about a synchronous count for the relevant sub-ID of the first transmitter 2. The receiver 5 is thus provided with the same offset rule as the first transmitter 2 and also with all other information used by the first transmitter 2 for generating the transmit times for the redundant packets. The receiver 5, by continuously continuing to count the time displacements for fixed packets, can thus predict the position in time of each redundant packet R1 and switch on the receiving unit when needed. Such a need is given, for example, if a defective fixed packet F1 is received so that the information from the subsequent redundant packet R1 is needed.

I claim:

1. A transmitter for unidirectionally transmitting a data stream of data packets over a unidirectional radio link including a receiver, the transmitter comprising:

an input unit for inputting the data packets;

a transmitter control unit connected to said input unit for receiving the data packets from said input unit, processing the data packets by inserting a predetermined test coding into each of the data packets, and generating a duplicate of each of the data packets, the respective duplicate including a type information item and an offset information item, said offset information item providing information on a time interval in which the duplicate data packet will follow its respective data packet;

a transmitting unit connected to said transmitter control unit for receiving each data packet and its duplicate transmitter control unit and transmitting each data packet and its duplicate regularly in succession with a time offset between each data packet and its duplicate, the time offset between each data packet and its duplicate varying in accordance with a predetermined offset rule and said offset information item; and the offset information item being generated from a predetermined counting sequence.

2. The transmitter according to claim 1, wherein:
the data packets have a content; and
the predetermined test coding results from the content of the respective data packets.

3. The transmitter according to claim 1, wherein said transmitter control unit controls said transmitting unit.

4. The transmitter according to claim 1, wherein:
said transmitting unit counts the data packets having been transmitted to produce a count; and
the predetermined counting sequence of the offset information item is derived from the count of the data packets transmitted by the transmitter.

5. The transmitter according to claim 1, further comprising an identity information item assigned to the transmitter and to be added to at least one of each of the data packets and the respective duplicates.

6. The transmitter according to claim 5, wherein said identity information item includes an unambiguous information item regarding the transmitter.

7. The transmitter according to claim 5, wherein said identity information item includes an information item selected from the group consisting of a respective type of each of the data packets and a respective significance of each of the data packets.

8. The transmitter according to claim 1, wherein: said transmitting unit is switchable between a switched-on state and a state with reduced energy consumption;
said transmitter control unit holds said transmitting unit in the switched-on state when one of the data packets and the duplicates are transmitted; and
said transmitter control unit holds said transmitting unit in the state with reduced energy consumption when none of the data packets and the duplicates are transmitted.

9. A receiver for unidirectionally receiving a data stream including data packets and duplicates of the data packets over a unidirectional radio link including a transmitter, the receiver comprising:
a receiving unit for receiving each of the data packets;
a receiver control unit connected to said receiving unit for receiving the data packets from said receiving unit, processing the data packets, and outputting the data packets;
said receiver control unit determining a test coding of each of the data packets, comparing the test coding with a content of the respective data packet to determine if each of the data packets is one of error-free and errored, and discarding errored data packets;
said receiver control unit determining times for an expected reception of each of the data packets;

said receiver control unit selectively evaluating two successive data packets by using a time interval between the two successive data packets;
said receiving unit receiving duplicates of the data packets, processing the duplicates, and outputting the duplicates;
said receiver control unit determining a test coding of each of the duplicates, comparing the test coding with a content of the respective duplicate to determine if each duplicate is errored, and discarding errored duplicates; and
said receiver control unit determining an offset rule for a time offset between each data packet and its duplicate by evaluating an offset information item taken from the respective duplicate, said offset information item providing information on a time interval in which a duplicate packet will follow its respective data packet, said receiver control unit selectively evaluating the duplicates by applying the offset rule.

10. The receiver according to claim 9, wherein the offset information item is generated from a predetermined counting sequence.

11. The receiver according to claim 10, wherein the predetermined counting sequence is formed from a count of the data packets having been received.

12. The receiver according to claim 9, wherein:
said receiver control unit switches said receiving unit between a switched-on state and a state with reduced energy' consumption;
said receiver control unit holds said receiving unit in the switched-on state when one of a reception of a data packet and a duplicate is expected; and
said receiver control unit holds said receiving unit in the state with reduced energy consumption when no reception is expected.

13. The receiver according to claim 12, wherein said receiver control unit selectively switches off the receiving unit for a predetermined time.

14. The receiver according to claim 9, wherein:
an identity information allocated to a transmitter is decoded from at least one of each of the data packets and the respective duplicate; and
the time interval between two data packets with matching identity information items is determined.

15. The receiver according to claim 9, wherein times of an expected reception of the data packets are determined by repetitively selectively evaluating a signal output by said receiving unit to said receiver control unit when in a search mode.

16. The receiver according to claim 15, wherein the times are calculated for the expected reception of the data packets by using a starting time on reception of a first of the data packets and from a predetermined interval time.

17. The receiver according to claim 16, wherein the predetermined interval time is reconstructed from a content of the first data packet.

18. The receiver according to claim 16, wherein the predetermined interval time is reconstructed from an interval time between two successive data packets.

19. The receiver according to claim 18, wherein one of the two successive data pockets is a first of the data packets.

20. A receiver for receiving a data stream including data packets and duplicates of the data packets over a radio link including a transmitter, the receiver comprising:
a receiving unit for receiving each of the data packets;
a receiver control unit connected to said receiving unit for receiving the data packets from said receiving unit, processing the data packets, and outputting the data packets;

said receiver control unit determining a test coding of each of the data packets, comparing the test coding with a content of the respective data packet to determine if each of the data packets is one of error-free and errored, and discarding errored data packets;

said receiver control unit determining times for an expected reception of each of the data packets;

said receiver control unit selectively evaluating two successive data packets by using a time interval between the two successive data packets;

said receiving unit receiving duplicates of the data packets, processing the duplicates, and outputting the duplicates;

said receiver control unit determining a test coding of each of the duplicates, comparing the test coding with a content of the respective duplicate to determine if each duplicate is errored, and discarding errored duplicates;

said receiver control unit determining an offset rule for a time offset between each of the data packets and the respective duplicates by evaluating an offset information item taken from the respective duplicates of each of the data packets and selectively evaluating the duplicates by applying the offset rule times of an expected reception of the data packets being determined by repetitively selectively evaluating a signal output by said receiving unit to said receiver control unit when in a search code; and the times for an expected reception of each of the data packets being calculated from an interval time between two of the data packets, the interval time being determined from a starting time on reception of a first of the data packets and from a retransmission time derived from a reception of a further one of the data packets.

21. A radio link, comprising:

a transmitter for unidirectionally transmitting a data stream of data packets over the unidirectional radio link, the transmitter including:

an input unit for inputting the data packets;

a transmitter control unit connected to said input unit for receiving the data packets from said input unit, processing the data packets by inserting a predetermined test coding into each of the data packets, and generating a duplicate of each of the data packets, the respective duplicate including a type information item and an offset information item, said offset information item providing information on a time interval in which a duplicate data packet will follow its respective data packet; and a transmitting unit connected to said transmitter control unit for receiving each data packet and its duplicate from said transmitter control unit and transmitting each data packet and its duplicate regularly in succession with a time offset between each data packet and its duplicate, the time offset between each data packet and its duplicate varying in accordance with a predetermined offset rule and said offset information item;

the offset information item being generated from a predetermined counting sequence; and a receiver for unidirectionally receiving a data stream including data packets and duplicates of the data packets over the unidirectional radio link, the receiver including:

a receiving unit for receiving each of the data packets;

a receiver control unit connected to said receiving unit for receiving the data packets from said receiving unit, processing the data packets, and outputting the data packets;

said receiver control unit determining a test coding of each of the data packets, comparing the test coding with a content of the respective data packet to determine if each of the data packets is one of error-free and errored, and discarding errored data packets;

said receiver control unit determining times for an expected reception of each of the data packets;

said receiver control unit selectively evaluating two successive data packets by using a time interval between the two successive data packets;

said receiving unit receiving duplicates of the data packets, processing the duplicates, and outputting the duplicates;

said receiver control unit determining a test coding of each of the duplicates, comparing the test coding with a content of the respective duplicate to determine if each duplicate is errored, and discarding errored duplicates; and said receiver control unit determining an offset rule for a time offset between each of the data packets and the respective duplicates by evaluating an the offset information item taken from at least one of a data packet and its duplicate and selectively evaluating the duplicates by applying the offset rule.

22. A combined transceiver module for a radio link, comprising:

a transmitter for unidirectionally transmitting a data stream of data packets over the unidirectional radio link, the transmitter including:

an input unit for inputting the data packets;

a transmitter control unit connected to said input unit for receiving the data packets from said input unit, processing the data packets by inserting a predetermined test coding into each of the data packets, and generating a duplicate of each of the data packets, the respective duplicate including a type information item and an offset information item, said offset information item providing information on a time interval in which a duplicate data packet will follow its respective data packet; and a transmitting unit connected to said transmitter control unit for receiving each data packet and its duplicate from said transmitter control unit and transmitting each data packet and its duplicate regularly in succession with a time offset between each data packet and its duplicate, the time offset between each data packet and its duplicate varying in accordance with a predetermined offset rule and said offset information item;

the offset information item being generated from a predetermined counting sequence; and a receiver for unidirectionally receiving a data stream including data packets and duplicates of the data packets over the unidirectional radio link, the receiver including:

a receiving unit for receiving each of the data packets;

a receiver control unit connected to said receiving unit for receiving the data packets from said receiving unit, processing the data packets, and outputting the data packets;

said receiver control unit determining a test coding of each of the data packets, comparing the test coding with a content of the respective data packet to determine if each of the data packets is one of error-free and errored, and discarding errored data packets;

said receiver control unit determining times for an expected reception of each of the data packets;

said receiver control unit selectively evaluating two successive data packets by using a time interval between the two successive data packets;

said receiving unit receiving duplicates of the data packets, processing the duplicates, and outputting the duplicates;

said receiver control unit determining a test coding of each of the duplicates, comparing the test coding with a content of the respective duplicate to determine if each duplicate is errored, and discarding errored duplicates; and said receiver control unit determining an offset rule for a time offset between each of the data packets and the respective duplicates by evaluating the offset information item taken from at least one of a data packet and its duplicate and selectively evaluating the duplicates by applying the offset rule.

23. The combined transceiver module according to claim 22, wherein said transmitter and said receiver are operably connected to one another to prevent collisions of the data packets and the duplicates of the data packets.

24. The combined transceiver module according to claim 23, wherein said receiver temporarily suppresses said transmitter during sampling of a data packet transmitted by another transmitter.

25. The combined transceiver module according to claim 23, wherein said receiver temporarily causes said transmitter to transmit data packets with a changed time interval during sampling of a data packet transmitted by another transmitter.

26. A method for unidirectionally transmitting a data stream having data packets in a unidirectional radio link between a transmitter and a receiver, the method which comprises the following steps:

providing a data packet to be transmitted;
inserting a predetermined test coding into the data packet;
transmitting the data packet by the transmitter;
generating a duplicate of the data packet and inserting a type information item into the duplicate;
generating an offset information item for a time offset between the data packet and the duplicate from a predetermined counting sequence, the offset information item providing information on a time interval in which a duplicate data packet will follow its respective data packet;
inserting the offset information item into at least one of the data packet and the its duplicate;
obtaining a time offset between the data packet and the duplicate from the offset information item in accordance with a predetermined offset rule;
transmitting, by the transmitter, the duplicate later than the data packet by the time offset.

27. The method according to claim 26, which further comprises forming the predetermined test coding from a content of the respective data packet.

28. The method according to claim 26, which further comprises:

counting the data packets having been transmitted to form a count; and
generating the predetermined counting sequence, from the count.

29. The method according to claim 26, which further comprises:

allocating an identity information item to the transmitter; and
adding the identity information item to the data packet transmitted by the transmitter and to the duplicate of the data packet.

30. A method for unidirectionally receiving a data stream having data packets in a unidirectional radio link having a transmitter and a receiver, the method which comprises a search mode and a transmission mode;

the search mode including the following steps:
sampling the data stream for data packets; and
predetermining times for an expected reception of each of the data packets;
sampling the data stream for duplicates of the data packets:
predetermining an offset rule for a time offset between data packets and the duplicates from an offset information item taken from the duplicate, the offset information item providing information on a time interval in which a duplicate data packet will follow its respective data packet;
the transmission mode including the following steps:
selectively evaluating of each of the data packets, comparing a test coding with the content of the data packet to determine if each of the data packets are error-free or errored; and
selectively evaluating each of the duplicates belonging to each of the errored data packets.

31. The method according to claim 30, which further comprises generating the offset information from a predetermined counting sequence.

32. The method according to claim 31, which further comprises using a count of the data packets having been received to form the predetermined counting sequence.

33. The method according to claim 29, which further comprises:

decoding the identity information item allocated to the transmitter of the data packet from one of the data packets; and
determining a time interval between two of the data packets with matching identity information items.

34. The method according to claim 30, which further comprises:

decoding an identity information item from at least one of each of the data packets and the respective duplicates, the identity information item having been allocated to a transmitter of the at least one of each of the data packets and the respective duplicates; and
determining an offset rule for a time offset between the data packet and the respective duplicates from the offset information item taken from the at least one of the data packets and the respective duplicates of the data packet.

35. The method according to claim 30, which further comprises, in the search mode, during the step of predetermining the times for the expected reception of each of the data packets, repeatedly selectively evaluating a signal output by a receiving unit to a receiver control unit.

36. The method according to claim 35, which further comprises calculating the expected reception of each of the data packets from a starting time when a first of the data packets is registered, and from a predetermined interval time between two of the data packets, the interval time being reconstructed from a content of the first data packet.

37. The method according to claim 35, which further comprises calculating the expected reception of each of the data packets from a starting time when a first of the data packets is registered, and from a predetermined interval time between two of the data packets, the interval time being reconstructed from a positioning in. time of the first data packet.

38. The method according to claim 35, which further comprises calculating times for the expected reception of one of the data packets from an interval time between two of the data packets, the interval time being determined from a starting time when a first data packet is registered and from a retransmission time when a further data packet is registered.

39. A method for operating a unidirectional radio link, which comprises:
a method for unidirectionally transmitting a data stream having data packets in a unidirectional radio link between a transmitter and a receiver, the method including the following steps:
providing a data packet to be transmitted;
inserting a predetermined test coding into the data packet;
transmitting, by the transmitter, the data packet;
generating a duplicate of the data packet and inserting a type information item into at least one of the data packet and its duplicate;
generating an offset information item for a time offset between the data packet and its duplicate from a predetermined counting sequence, the offset information item providing information on a time interval in which a duplicate data packet will follow its respective data packet;
inserting the offset information item into the respective duplicate;
obtaining a time offset between the data packet and the duplicate from the offset information item in accordance with a predetermined offset rule; and
transmitting, by the transmitter, the duplicate later than the data packet by the time offset; and
a method for unidirectionally receiving a data stream having data packets in a unidirectional radio link having a transmitter and a receiver, the method which includes a search mode and a transmission mode;
the search mode including the following steps:
sampling the data stream for data packets; and
predetermining times for an expected reception of each of the data packets;
sampling the data steam for duplicates of the data packets;
predetermining an offset rule for a time offset between each data packet and its duplicate from the offset information item;
the transmission mode including the following steps:
selectively evaluating of each of the data packets, comparing a test coding with the content of the data packet to determine if each of the data packets are error-free or errored; and
selectively evaluating one of the duplicates belonging to each of the errored data packets.

40. A bicycle computer, comprising:
a transmitter for unidirectionally transmitting a data stream of data packets over a unidirectional radio link, the transmitter including:
an input unit for inputting the data packets;
a transmitter control unit connected to said input unit for receiving the data packets from said input unit, processing the data packets by inserting a predetermined test coding into each of the data packets, and generating a duplicate of each of the data packets, the duplicate including a type information item and an offset information item, said offset information item providing information on a time interval in which a duplicate data packet will follow its respective data packet; and
a transmitting unit connected to said transmitter control unit for receiving each, data packet and its duplicate from said transmitter control unit and transmitting each data packet and its duplicate regularly in succession with a time offset between each data packet and its duplicate, the time offset between each data packet and its duplicate varying in accordance with a predetermined offset rule and said offset information item;
the offset information item being generated from a predetermined counting sequence; and
a receiver for unidirectionally receiving a data stream including data packets and duplicates of the data packets over a unidirectional radio, the receiver including:
a receiving unit for receiving each of the data packets;
a receiver control unit connected to said receiving unit for receiving the data packets from said receiving unit, processing the data packets, and outputting the data packets;
said receiver control unit determining a test coding of each of the data packets, comparing the test coding with a content of the respective data packet to determine if each of the data packets is one of error-free and errored, and discarding errored data packets;
said receiver control unit determining times for an expected reception of each of the data packets;
said receiver control unit selectively evaluating two successive data packets by using a time interval between the two successive data packets;
said receiving unit receiving duplicates of the data packets, processing the duplicates, and outputting the duplicates;
said receiver control unit determining a test coding of each of the duplicates, comparing the test coding with a content of the respective duplicate to determine if each duplicate is errored, and discarding errored duplicates; and
said receiver control unit determining an offset rule for a time offset between each of the data packets and the respective duplicates by evaluating the offset information item taken from at least one of a data packet and its duplicate and selectively evaluating the duplicates by applying the offset rule;
a sensor connected to said transmitter, said sensor measuring data selected from the group consisting of wheel rotations, pedal rotations, and resistance to movement; and
a display connected to said receiver for indicating the data transmitted by the sensor.

41. A fitness computer, comprising:
a transmitter for unidirectionally transmitting a data stream of data packets over a unidirectional radio link, the transmitter including:
an input unit for inputting the data packets;
a transmitter control unit connected to said input unit for receiving the data packets from said input unit, processing the data packets by inserting a predetermined test coding into each of the data packets, and generating a duplicate of each of the data packets, the duplicate including a type information item and an offset information item, said offset information item providing information on a time interval in which the duplicate data packet will follow its respective data packet; and
a transmitting unit connected to said transmitter control unit for receiving each data packet and its duplicate from said transmitter control unit and unidirectionally transmitting each data packet and its duplicate regularly in succession with a time offset between each data packet and its duplicate, the time offset between each data packet and its duplicate varying in accordance with a predetermined offset rule and an said offset information item;
the offset information item being generated from a predetermined counting sequence; and a receiver for unidirectionally receiving a data stream including data packets and duplicates of the data packets over a radio link, the receiver including:

a receiving unit for unidirectionally receiving each of the data packets;

a receiver control unit connected to said receiving unit for receiving the data packets from said receiving unit, processing the data packets, and outputting the data packets;

said receiver control unit determining a test coding of each of the data packets, comparing the test coding with a content of the respective data packet to determine if each of the data packets is one of error-free and errored, and discarding errored data packets;

said receiver control unit determining times for an expected reception of each of the data packets;

said receiver control unit selectively evaluating two successive data packets by using a time interval between the two successive data packets:

said receiving unit receiving duplicates of the data packets, processing the duplicates, and outputting the duplicates;

said receiver control unit determining a test coding of each of the duplicates, comparing the test coding with a content of the respective duplicate to determine if each duplicate is errored, and discarding errored duplicates; and said receiver control unit determining an offset rule for a time offset between each of the data packets and the respective duplicates by evaluating the offset information item taken from at least one of a data packet and its duplicate and selectively evaluating the duplicates by applying the offset rule;

a sensor connected to said transmitter, said sensor measuring data selected from the group consisting of a heartbeat and a stepping rate of a user; and a display connected to said receiver exhibits for displaying the data measured by said sensor.

* * * * *